US012704143B2

(12) United States Patent
Perez et al.

(10) Patent No.: US 12,704,143 B2
(45) Date of Patent: Aug. 11, 2026

(54) FIXING DEVICE

(71) Applicant: DEERE & COMPANY, Moline, IL (US)

(72) Inventors: Javier Jose Perez, Pinto (ES); Prashant Jundale, Pune (IN); Pratik Gandhi, Pune (IN)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 18/594,272

(22) Filed: Mar. 4, 2024

(65) Prior Publication Data

US 2024/0318681 A1 Sep. 26, 2024

(30) Foreign Application Priority Data

Mar. 20, 2023 (EP) .................................... 23162971

(51) Int. Cl.
*F16B 21/20* (2006.01)
*F16J 15/3212* (2016.01)

(52) U.S. Cl.
CPC ........... *F16B 21/20* (2013.01); *F16J 15/3212* (2013.01)

(58) Field of Classification Search
CPC .......... F16D 43/14; F16D 43/16; F16D 43/18; F16D 2043/145; F16J 15/32; F16J 15/322; F16J 15/3204; F16J 15/3208; F16J 15/3212; F16J 15/3248; F16J 15/3252; F16J 15/3268; F16J 15/3272; F16J 15/3276
See application file for complete search history.

(56) References Cited

U.S. PATENT DOCUMENTS

| | | | | |
|---|---|---|---|---|
| 1,927,509 A * | 9/1933 | Waterhouse | F16D 43/14 | 192/104 C |
| 2,197,522 A * | 4/1940 | Ferguson | F16D 13/14 | 192/75 |
| 3,246,727 A * | 4/1966 | Moore | F16D 43/18 | 192/105 CD |
| 4,102,538 A * | 7/1978 | Bertin | F16J 15/3232 | 277/572 |

(Continued)

FOREIGN PATENT DOCUMENTS

| | | | |
|---|---|---|---|
| CH | 673324 A5 * | 2/1990 | F16J 15/3224 |
| DE | 1042981 B * | 11/1958 | |

(Continued)

*Primary Examiner* — Jonathan P Masinick
(74) *Attorney, Agent, or Firm* — Taft Stettinius & Hollister LLP; Stephen F. Rost

(57) ABSTRACT

Fixing device for a shaft sealing ring and transmission device having such a device. A fixing device for a shaft sealing ring is disclosed. Furthermore, a transmission device is disclosed, wherein the transmission device comprises a first transmission part which is rotatable about an axis of rotation, a sealing seat formed in the first transmission part, a shaft sealing ring fitted in the sealing seat and a second transmission part which extends through the first transmission part and the shaft sealing ring and is rotatable about the axis of rotation. A sealing lip is formed on the shaft sealing ring, the sealing lip engaging with an outer surface of the second transmission part and being pretensioned by a spring element arranged on the shaft sealing ring. The transmission device also has a fixing device for the shaft sealing ring.

8 Claims, 6 Drawing Sheets

(56) References Cited

U.S. PATENT DOCUMENTS

| | | | | |
|---|---|---|---|---|
| 8,668,390 | B2 * | 3/2014 | Schweitzer | F16J 15/3252 277/577 |
| 8,852,070 | B2 * | 10/2014 | Peters | B04B 9/12 494/12 |
| 10,385,927 | B2 * | 8/2019 | Larson | F16D 43/18 |
| 10,711,842 | B2 * | 7/2020 | Liebe | F16C 33/783 |
| 11,131,384 | B2 * | 9/2021 | Jordan | F16J 15/164 |
| 11,255,382 | B2 * | 2/2022 | Neoh | F16C 33/7883 |
| 11,384,839 | B2 * | 7/2022 | Sato | F16J 15/3212 |
| 12,372,154 | B2 * | 7/2025 | Liu | F16J 15/3248 |
| 2011/0068542 | A1 * | 3/2011 | Nakagawa | F16J 15/3244 277/549 |
| 2012/0104701 | A1 | 5/2012 | Bertini et al. | |
| 2020/0248753 | A1 * | 8/2020 | Achtsnit | F16D 13/56 |

FOREIGN PATENT DOCUMENTS

| | | | | | |
|---|---|---|---|---|---|
| DE | 2145783 | A1 | * | 3/1973 | |
| DE | 2347479 | A1 | * | 3/1975 | |
| DE | 3606994 | A1 | | 9/1987 | |
| DE | 102011005920 | A1 | * | 9/2012 | F16J 15/3252 |
| DE | 102012107382 | A1 | * | 2/2014 | F16J 15/3252 |
| DE | 102012218099 | A1 | | 4/2014 | |
| DE | 102015103921 | A1 | * | 9/2016 | F16H 7/023 |
| EP | 1990565 | A1 | * | 11/2008 | F16F 1/12 |
| GB | 2147060 | A | * | 5/1985 | F16J 15/3208 |

* cited by examiner 44
48
38
42
40
54
50
46
12
52
18
48

16
24
42
52
18
14
28
12
50
26

56
50
26
64
42
28
18
62
12

FIXING DEVICE

RELATED APPLICATIONS

This application claims priority to international application EP 23162971.8, filed on Mar. 20, 2023, which is hereby incorporated by reference in its entirety.

FIELD OF THE DISCLOSURE

The disclosure relates to a fixing device for a shaft sealing ring.

BACKGROUND

Shaft lead-throughs on transmission housings with shaft seals are known, wherein the shaft seals are used to prevent leakage of oils, lubricants or grease and at the same time the ingress of dust, dirt and the like from the outside into the interior of the transmission. In particular, the outlet and inlet openings of rotating shafts arranged on a transmission housing are particularly at risk. For example, radial shaft sealing rings are used on rotating shafts, wherein the shaft sealing rings are inserted, fitted or pressed in on a housing part and the rotating shaft is sealed by a scaling lip formed on the shaft sealing ring. In order to ensure seal-tightness between the sealing lip and the rotating shaft, a spring ring in the form of a worm spring or tube spring is provided, which is fitted into the shaft sealing ring and exerts a radial contact force on the sealing lip in the direction of the rotating shaft. This increases the service life of the shaft sealing ring or extends the sealing effect of the sealing lip, which decreases as a result of wear.

Radial shaft sealing rings are installed securely in the housing or housing cover or in a seal bearing seat of a transmission. The sealing lip thereof runs on the surface of the rotating shaft and is usually pressed radially onto the shaft surface by a tube spring or worm spring. The radial shaft sealing ring consists of an elastomer part, a stiffening ring and the previously mentioned tube or worm spring. The outer surface on the elastomer part of the shaft sealing ring provides a secure static seal on the housing or the housing cover and fixes the radial shaft sealing ring on the housing or housing cover. The stiffening ring provides the radial shaft sealing ring or the elastomer part with the required stability. By means of the tube spring or worm spring, the sealing lip is additionally pretensioned to ensure that the sealing lip is radially pressed onto the rotating shaft. In addition to the actual sealing lip, which is pressed onto the rotating shaft by the aforementioned springs, a protective lip, which retains dirt and dust from the outside, can also be provided. Owing to the simple design, the shaft sealing ring can usually be easily fitted or removed.

Radial shaft sealing rings of the type described above are, for example, disclosed in the following documents.

DE 102012218099 A1 describes a sealing arrangement for scaling a shaft against a medium. The sealing arrangement comprises a spring element and a shaft sealing ring with a first sealing lip and a second sealing lip. The spring element is designed to press the shaft scaling ring against the shaft. The second sealing lip is smaller in the radial direction of the shaft scaling ring than the first sealing lip. This means that the shaft sealing ring is stepped.

US 20120104701 A1 discloses a further embodiment of a shaft sealing ring, wherein a seal comprises an annular part having a static sealing surface which is in contact with a first element and is composed of an elastomer material. An annular lip exerts dynamic scaling in relation to a second element. A worm spring and a leaf spring cooperate to retain the annular lip on a sliding surface of the second element in an operating configuration.

In addition, DE 3606994 A1 also discloses a shaft sealing ring having a radially outer static sealing part, which can be fitted into a housing opening. The radially outer sealing part is also reinforced by a metal ring. Furthermore, the shaft sealing ring has an inner sealing part on which is formed a radially inwardly directed sealing lip which can be brought into engagement with a rotating shaft for sealing same. The inner sealing part is surrounded by a worm spring, which exerts a radially inwardly directed pretensioning force and presses the inner scaling part and the sealing lip formed thereon onto the surface of the rotating shaft.

The embodiments of radial shaft sealing rings known in the prior art are mainly suitable for transmissions having static, i.e. fixed housings, i.e. for transmissions having housing parts in which the shaft sealing ring is fitted and which are not rotated. In other words, the shaft sealing ring itself is then not subject to rotation either. In the case of transmission housings which, however, also themselves rotate, the problem now arises that the shaft sealing ring rotates at the same time and is exposed to certain centrifugal forces. Due to the rotational movement of the shaft sealing ring and the associated centrifugal forces, the pretensioning effect of the tube spring may be partially compensated for and the tube spring may become detached or spring out, and thus the sealing lip may become detached from the component to be sealed and the sealing function of the scaling lip is greatly impaired or even completely dispensed with, since a contact force is no longer applied to the surface of the rotating shaft by the tube spring.

The disclosure provides a device that can be used in a transmission device with rotatable housing parts so that the aforementioned problems are overcome.

SUMMARY

According to the disclosure, a fixing device for a shaft scaling ring of the type mentioned at the beginning is designed such that a retaining ring is provided which is rotatable about an axis of rotation and has a plurality of pivot bodies arranged pivotably, wherein each pivot body has a pivot bearing through which the retaining ring extends as a pivot axis, wherein each of the pivot bodies comprises a first and second pivot arm which each extend from the pivot bearing in opposite directions axially with respect to the axis of rotation such that the retaining ring is arranged between the respective pivot arms and a deflection of the respective first pivot arms in a first direction radially with respect to the axis of rotation causes a deflection of the respective second pivot arms in a direction opposite to the first direction radially with respect to the axis of rotation. The oscillating suspension of the pivot bodies on the retaining ring with opposite axial extents of the respective pivot arms ensures that a deflection of the respective one pivot arm in one direction causes a deflection of the respective opposite other pivot arm in the opposite direction.

The pivot arms are designed and dimensioned in such a way that the product of the mass of the first pivot arm and the distance of the mass center of gravity of the first pivot arm from the pivot axis is greater than the product of the mass of the second pivot arm and the distance of the mass center of gravity of the second pivot arm from the pivot axis, and therefore a centrifugal force arising by rotation of the retaining ring about an axis of rotation causes the first pivot arm to be deflected radially outward with respect to the axis of rotation. The greater the rotational speed of the retaining ring, the greater the centrifugal force which arises and the associated deflection of the first pivot arm radially outward and that of the second pivot arm radially inward, relative to the axis of rotation of the retaining ring. Thus, an increase in the rotational speed of the retaining ring is directly connected to an increase in the force which moves the second pivot arm radially inward with respect to the axis of rotation and with which the second pivot arm is pushed or pressed onto the spring element and fixes the latter. In order to produce a sufficiently high centrifugal force with which a resulting contact force against the sealing lip or on the tube spring is generated, the pivot bodies are made of metal or another castable material having a comparably high density. Alternatively, however, in addition to a casting method, other methods for producing the pivot bodies may also be suitable. The latter can thus also be produced in a stamping or forging method.

The abovementioned fixing device is used in a transmission device, wherein the latter is formed with a first transmission part which is rotatable about an axis of rotation, a sealing seat formed in the first transmission part, a shaft sealing ring fitted in the sealing seat and a second transmission part which extends through the first transmission part and the shaft sealing ring and is rotatable about the axis of rotation. The first and the second transmission part can furthermore be arranged rotatably relative to each other or else can rotate at common rotational speed. A scaling lip is formed on the shaft sealing ring, the sealing lip engaging with an outer surface of the second transmission part. The sealing lip is pretensioned by a spring element arranged on the shaft sealing ring such that an additional contact pressure of the sealing lip is exerted on the outer surface of the second transmission part. The fixing device is arranged in the transmission device in such a manner that, by rotation of the retaining ring, the second pivot arm of each pivot body pivots in the direction of the second transmission part and, by rotation of the retaining ring, exerts a contact force in the direction of the second transmission part.

The spring element arranged on the shaft sealing ring can be designed as a tube spring, worm spring or annular spring, with other types of spring elements which exert a contact force, which is directed radially inward with respect to the second transmission part, on the sealing lip also being usable. A tube spring, worm spring or annular spring is a circular ring made of a coiled compression spring, which is bent into a circle and connected together at the two ends. A tube spring produces a radial force which is directed toward the center of the tube spring when the radius of the tube spring increases. In other words, a tube spring, worm spring or annular spring is closed over the circumference and has a similar effect to a rubber band.

An annular groove can be formed in the sealing seat of the first transmission part, in which annular groove the retaining ring of the fixing device is mounted, wherein the second pivot arm of each pivot body protrudes into the shaft sealing ring and can be brought into engagement with the spring element by rotation of the retaining ring. The retaining ring is fixed axially in the region of the sealing seat by being mounted in an annular groove. The lengths of the respective second pivot arms are dimensioned such that they act on the spring element from above in the direction of the axis of rotation and fix or hold down or press down the latter by means of a contact force. The more pivot bodies are distributed over the circumference of the retaining ring, the more evenly the spring element is loaded over its circumference and the more evenly the sealing lip is also pressed over its circumference onto the outer surface of the second transmission part.

The transmission device as claimed in claim 3 or 4, wherein recesses distributed over the circumference of the sealing seat are formed in the sealing seat of the first transmission part in such a manner that the first pivot arm of each pivot body is movable into the recesses. The recesses allow the respective first pivot arms to be pivoted radially outward. The more the centrifugal force forces the pivot arms outward, the more they protrude into the recesses. In other words, as the speed of rotation of the retaining ring or of the first transmission part increases, the degree to which the first pivot arms protrude into the recesses increases. At the same time, the degree to which the respective second pivot arms press against the spring element thus also increases and they act upon and fix the latter increasingly with a contact force.

The transmission device can be designed as a toothed belt transmission and the first transmission part can be connected to a first belt pulley of the toothed belt transmission for rotation therewith. It is also possible for other transmission devices in which shaft sealing rings are used to be equipped with an abovementioned fixing device, this being advantageous if the sealing function of the sealing lip is put at risk by rotation of the shaft sealing ring. Thus, when the shaft sealing ring is rotated, the co-rotating retaining ring or the pivot bodies, which are arranged thereon, of the fixing device can ensure fixing of the spring element, and a contact force against the sealing lip and thus a reliable sealing function of same can be ensured.

The second transmission part can be connected to an output shaft of the toothed belt transmission in an axially displaceable manner and for rotation therewith. Thus, a rotationally fixed connection of the second transmission part to an output shaft can be made and an axial displacement of the second transmission part can permit same to be connected to various other rotating transmission parts, for example, with different gearwheel stages or differently driven rotary bodies. This makes it possible for different rotational speeds of the output shaft to be achieved.

The second transmission part can be connected by axial displacement either to the first belt pulley or to a second belt pulley of the toothed belt transmission for rotation therewith. For example, the belt pulleys can have different diameters and both can be brought into rotational connection with the same output shaft. Optionally, different transmission ratios can then be created and different rotational speeds and torques thus achieved at the output shaft.

The disclosure and further advantages and advantageous developments and embodiments of the disclosure will be described and explained in more detail below with reference to the drawing which shows an exemplary embodiment of the disclosure.

BRIEF DESCRIPTION OF THE DRAWINGS

The present disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figures 1A, 1B, 1C, 1D:
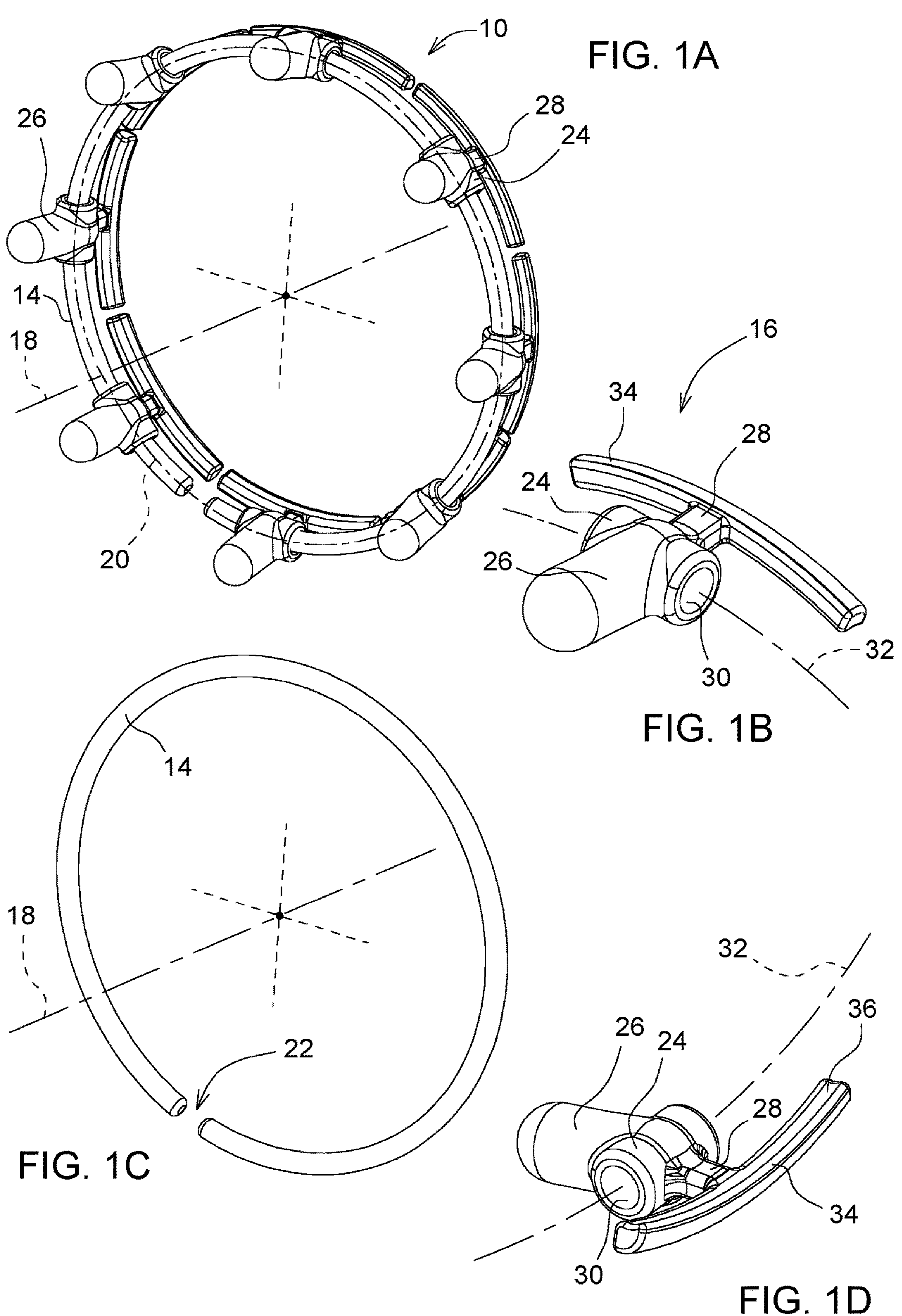
FIG. 1*a* is a schematic perspective view of a fixing device according to the disclosure.
FIG. 1*b* is a schematic perspective view of a retaining ring of the fixing device from FIG. 1*a*.
FIG. 1*c* is a schematic perspective view of a top side of a pivot body of the fixing device from FIG. 1*a*.
FIG. 1*d* is a schematic perspective view of an underside of the pivot body from FIG. 1*c*.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

A fixing device 10, shown in FIGS. 1*a* to 1*d*, for a shaft sealing ring 12 comprises a retaining ring 14 and a plurality of pivot bodies 16 arranged on the circumference of the retaining ring 14. The retaining ring 14 is depicted in a separate illustration in FIG. 1*b* and consists of a round or circular profile (or else wire), the ends of which are joined together about an axis of rotation 18 to form a ring. The retaining ring 14 forms, with its longitudinal center axis, a pivot axis 20 for the plurality of pivot bodies 16, which are inserted via an opening 22 formed between the ends of the ring (FIG. 1*b*) into the retaining ring 14 and are pivotably suspended or pivotably mounted thereon, as in particular FIG. 1*a* shows. The retaining ring is rotationally symmetrical to the axis of rotation 18.

In the exemplary embodiment shown in FIG. 1*a*, eight pivot bodies 16 are arranged on the holding ring 14 in a manner distributed pivotably over the circumference, the number being variable and it also being possible for more or fewer pivot bodies 16 to be arranged in a manner distributed over the circumference. As shown more precisely in detail in FIGS. 1*c* and 1*d*, each pivot body 16 comprises a pivot bearing 24, a first pivot arm 26 and a second pivot arm 28. The pivot bearing 24 comprises a through opening 30 with a circular cross section and a diameter dimensioned according to the diameter of the retaining ring 14 and an arc-shaped longitudinal profile such that a center line 32 extending through the pivot bearing 24 depicts a circular arc of the retaining ring 14. Starting from the pivot bearing 24, the first pivot arm 26 extends in a first direction with respect to the axis of rotation 18 and the second pivot arm 28 extends in an opposite second direction with respect to the axis of rotation 18. The first pivot arm 26 is in the form of a cylindrical extent. The second pivot arm 28 is in the form of a T-shaped extent. The first and second pivot arm 26, 28 are designed such that the product of the distance of the mass center of gravity of the first pivot arm 26 from the pivot axis 20 on the retaining ring 14 and the mass of the first pivot arm 26 is greater than the product of the distance of the mass center of gravity of the second pivot arm 28 from the pivot axis 20 on the retaining ring 14 and the mass of the second pivot arm 28. Thus, it is ensured that, when the retaining ring 14 rotates about the axis of rotation 18, the torque, which is generated by the centrifugal force of the first pivot arm 26, about the pivot axis 20 is greater than the torque, which is generated by the centrifugal force of the second pivot arm 28, and therefore the first pivot arm 26 is moved or forced outward radially with respect to the axis of rotation 18 and the second pivot arm 28 inward radially with respect to the axis of rotation. The second pivot arm 28 has a pivot arm part 34 formed parallel along the pivot axis 20 and the center line 32, with an arcuate profile, wherein, furthermore, a retaining groove 36 is formed on the side facing the axis of rotation 18 of the pivot arm part 34, as can be seen in FIG. 1*d*.

The pivot bodies 16 are made of metal, in particular of a cast-iron material. The higher the density of the material is selected, the stronger the lever effect of the pivot bodies 16 can be and thus also a fixing effect of the fixing device.

Figures 2A, 2B, 2C:
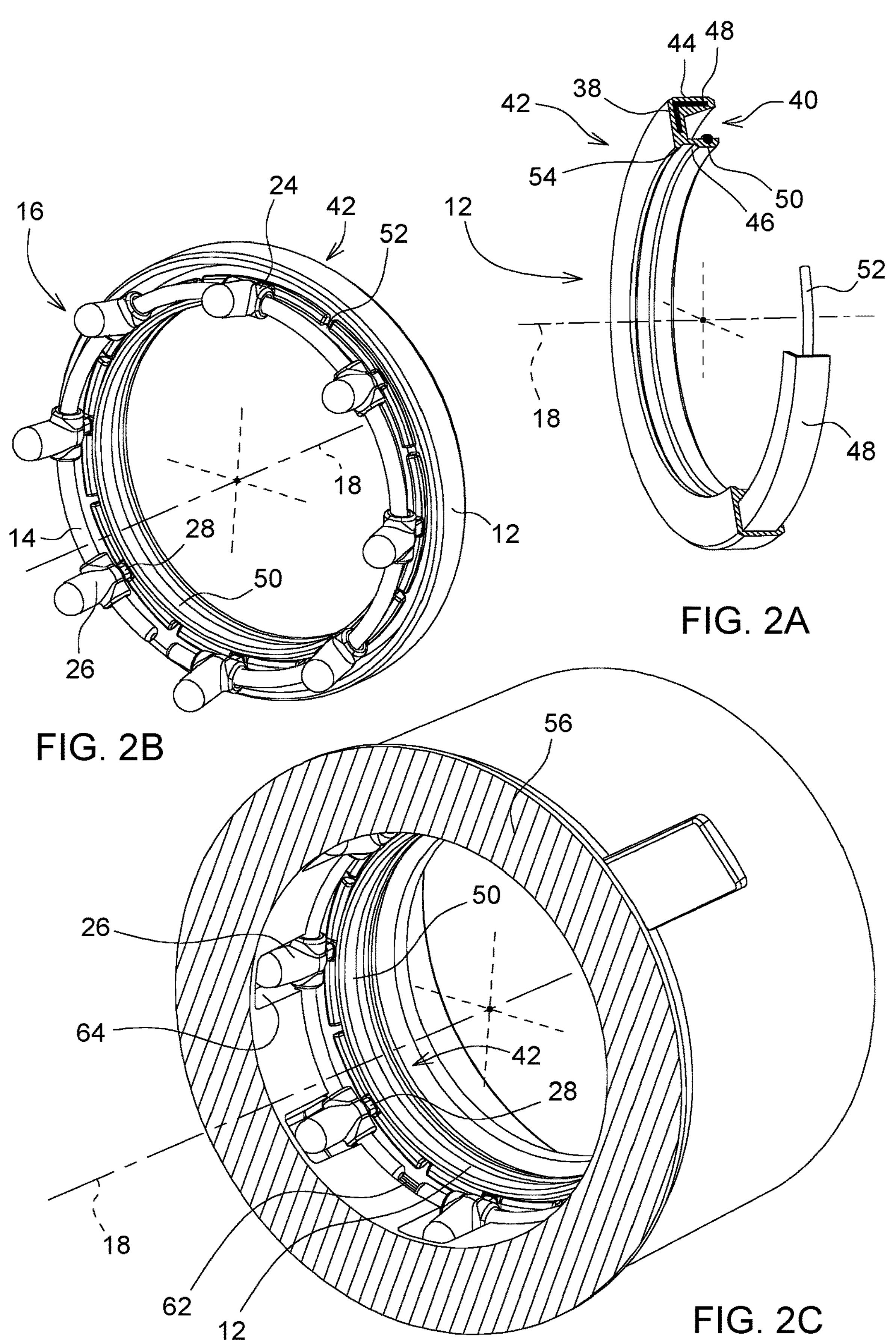
FIG. 2*a* is a schematic perspective partial cross-sectional view of a shaft sealing ring.
FIG. 2*b* is a schematic perspective view of an assembly of the shaft sealing ring from FIG. 2*a* with the fixing device from FIG. 1*a*.
FIG. 2*c* is a schematic perspective view of an assembly of shaft sealing ring and fixing device from FIG. 2*b* in an exemplary transmission part.

FIG. 2*a* shows a conventional shaft sealing ring 12, as is used in the exemplary embodiment described here. Such a shaft sealing ring 12 comprises an annular elastomer part 38 which is in the form of a U-profile and is formed about an axis of rotation 18 into a ring. In this case, an open side 40 of the U-profile faces in an axial direction and a closed side 42 of the U-profile in the correspondingly other axial direction of the axis of rotation 18, thus resulting in an outer leg 44 opposite the axis of rotation 18 and an inner leg 46 of the U-profile. The elastomer part 38 is formed in the region of the outer leg 44 and the closed side 42 of the U-profile with a likewise annular stiffening part 48, which is framed in the elastomer part 38 and provides the shaft sealing ring 12 with corresponding stability and rigidity. On the side of the inner leg 46 facing the axis of rotation 18, an annular sealing lip 50 is in the form of an annular elevation directed radially with respect to the axis of rotation 18. On the side of the inner leg 46 facing away from the axis of rotation 18, at a point identical axially to the axis of rotation 18, there is an annular groove in which a spring element 52 in the form of a tube spring (also annular spring or worm spring) is embedded. The spring element 52 causes the sealing lip 50 to be pretensioned radially in the direction of the axis of rotation 18. At a transition region between the closed side 42 and the inner leg 46 of the U-profile, a protective lip 54 is also formed, which extends in an annular manner at an angle both axially in the direction of the closed side 42 of the U-profile and radially in the direction of the axis of rotation 18.

Figure 3:
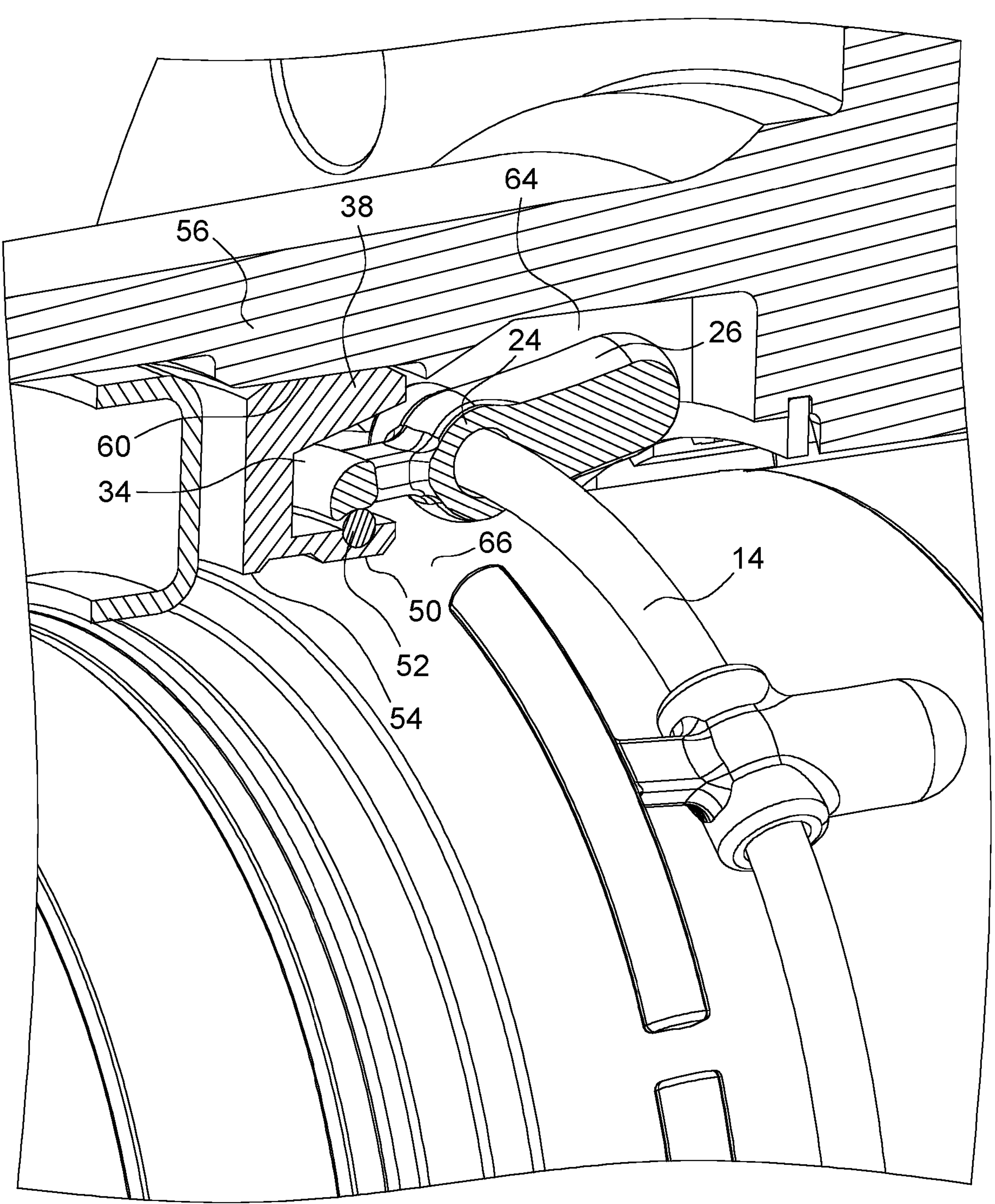
FIG. 3 is a schematic perspective cross-sectional view of a segment of an assembly of shaft sealing ring and fixing device from FIG. 2*b* in a first and a second transmission part.

FIGS. 2*b* and 2*c* illustrate how the fixing device 10 described above interacts with a commercially available and conventional shaft sealing ring 12 according to FIG. 2*a*. For this purpose, the fixing device 10 and the shaft sealing ring 12 are inserted or fitted into a first transmission part 56 to be sealed of a transmission device 58, which is described more precisely further below. As can be seen particularly well in FIG. 3, a sealing seat 60, in which the scaling shaft sealing ring 12 is fitted and received, is formed in the first transmission part 56. In connection with the sealing seat 60, a retaining ring groove 62, in which the retaining ring 14 of the fixing device 10 is inserted or fixed, is formed in the first transmission part 56. According to a number and position of the pivot bodies 16 provided on the fixing device 10 recesses 64 are formed on the first transmission part 56 at the same axial position with respect to the axis of rotation 18, the recesses extending radially outward with respect to the axis of rotation 18 and axially into the transmission device interior. The recesses 64 are dimensioned in such a way that space and pivot space is created for the pivot bodies 16 of the fixing device 10 such that they are pivotable freely, on the one hand, and, on the other hand, the fixing of the retaining ring 14 in the retaining ring groove 62 is made possible. For sealing the transmission device 58 or a rotatable first transmission part 56 and a second rotatable transmission part 66, which is mounted therein, of the transmission device 58, see also FIGS. 3 to 6, the fixing device 10 with the first pivot arms 26 is first of all inserted beforehand (pointing into the inner region of the transmission device) such that the retaining ring 14 is embedded in the retaining ring groove 62. As a result, the fixing device 10 and thus the pivot bodies 16 are fixed in the first transmission part 56 and the pivot bodies 16 are received in a freely pivotable manner in the recesses 64 formed in the first transmission part 56. Thereafter, the shaft sealing ring 12 can be inserted or fitted into the sealing seat 60, wherein the second pivot arms 28 of the fixing device 10 on the open side 40 of the shaft sealing ring 12 protrude into the interior of the shaft sealing ring 12, and therefore the second pivot arms 28 with their pivot arm parts 34 and the retaining grooves 36 formed thereon engage on the spring element 52 and press on and fix the latter, which can be seen particularly clearly in FIG. **2*b* and FIG. 3. The protective lip 54 is dimensioned in such a way that it seals an annular gap between the elastomer part 38 and the second transmission part 66** against penetrating dirt particles from the outside.

Figure 4:
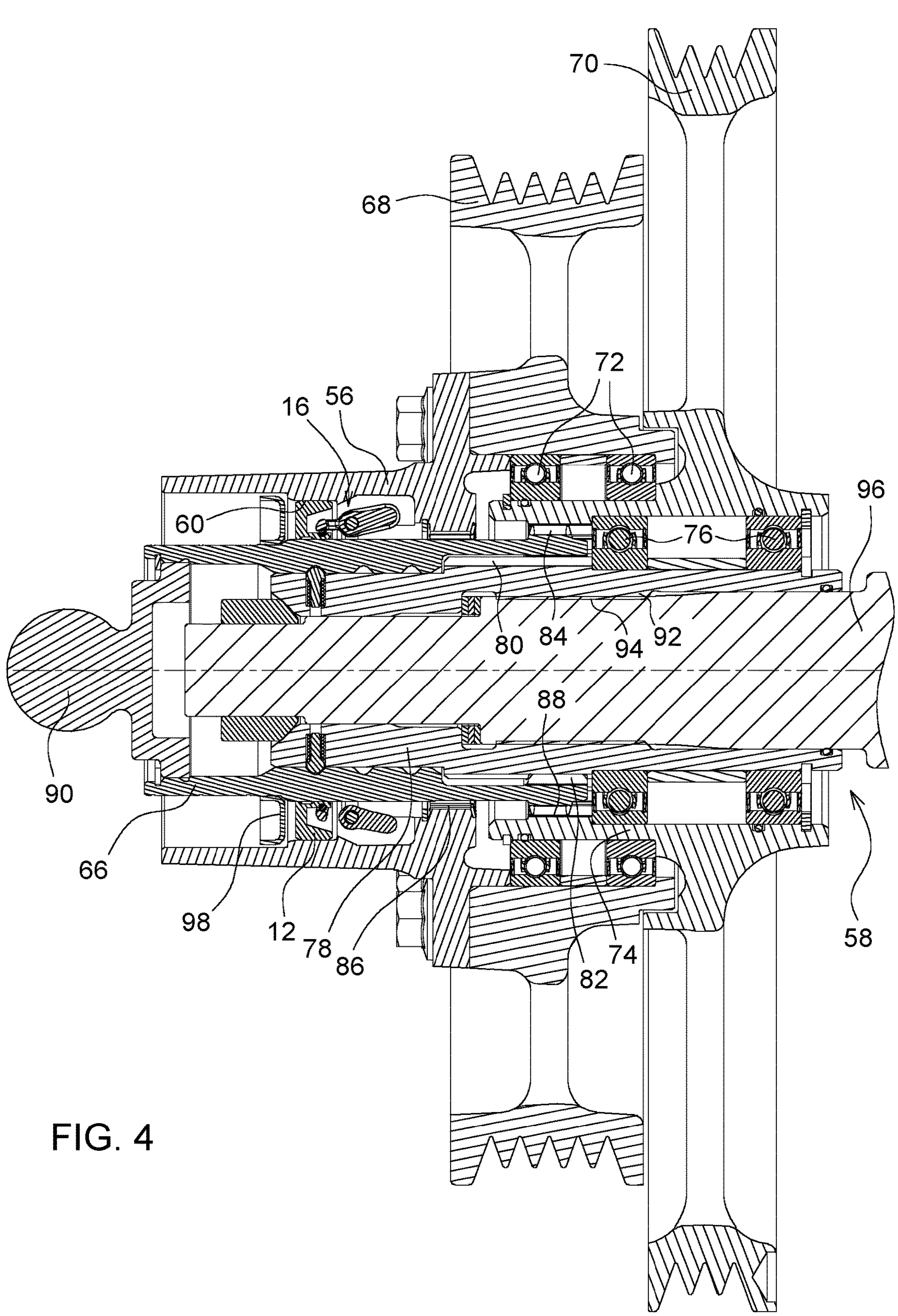
FIG. 4 is a schematic cross-sectional view of a transmission device with shaft scaling ring and fixing device from FIG. 2*b*.
Figure 5:
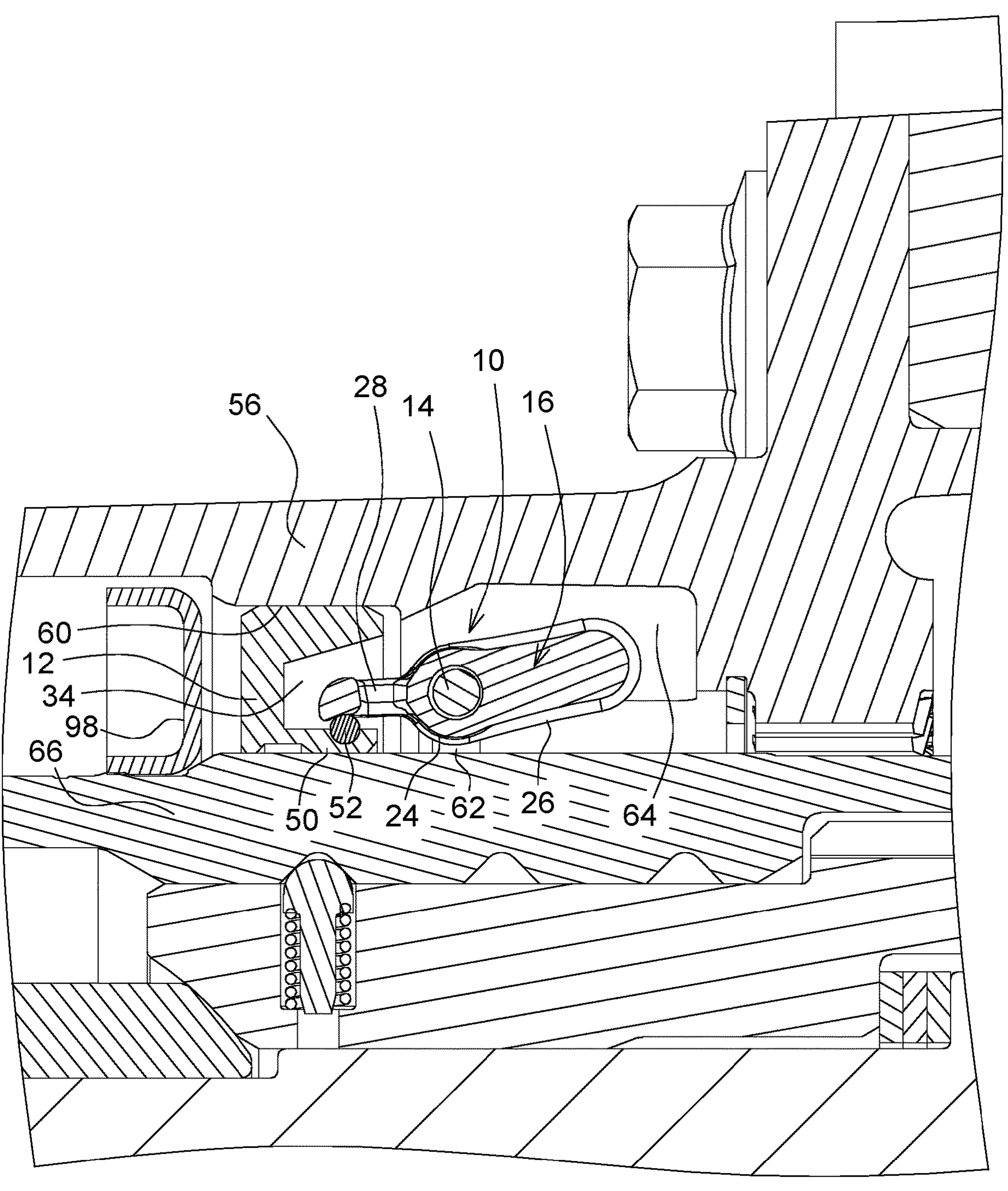
FIG. 5 is an enlarged part of the cross-sectional view from FIG. 4.
Figure 6:
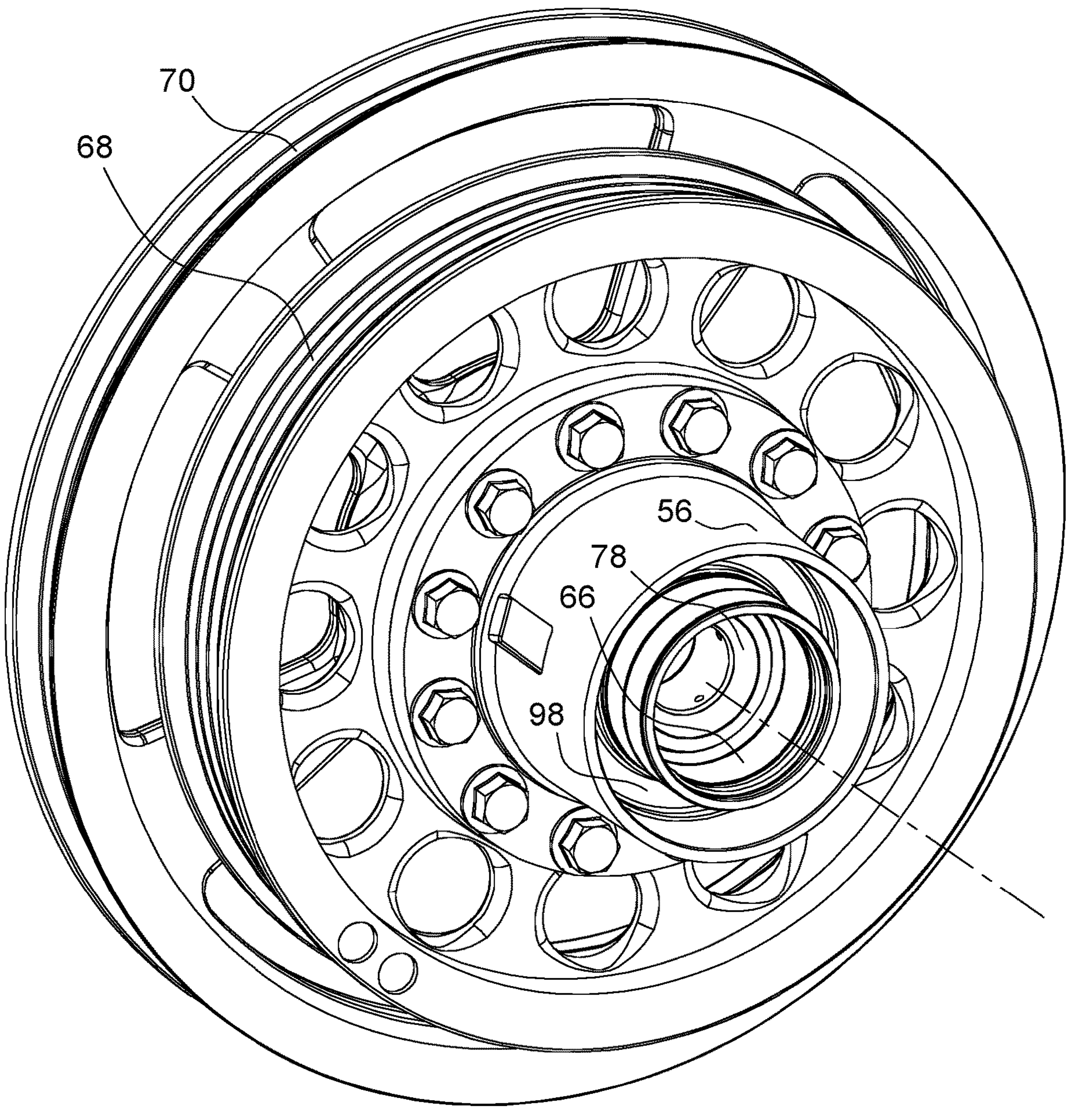
FIG. 6 is a schematic perspective view of the transmission device from FIG. 4.

FIGS. 4 to 6 show in detail the transmission device 58 with shaft scaling ring 12 and fixing device 10 for sealing the rotatable first transmission part 56 with respect to the likewise rotatable second transmission part 66. The fixing device 10 and the shaft sealing ring 12 are arranged in the first transmission part 56, as described above. In this example, the transmission device 58 is designed as part of a toothed belt transmission (not shown) and comprises a first belt pulley 68 and a second belt pulley 70 as drive bodies, wherein the first and the second belt pulleys 68, 70 are each driven or brought into rotation by a belt (not shown) of the toothed belt transmission.

The first transmission part 56 is connected to the first belt pulley 68 for rotation therewith. The first belt pulley 68 is mounted via a set of ball bearings 72 so as to be rotatable and axially fixed on a bearing flange 74 formed on the second belt pulley 70. The second belt pulley 70 is mounted via a further set of ball bearings 76 so as to be rotatable and axially fixed on an output shaft 78. The second transmission part 66 is mounted in an axially displaceable manner on an external toothing 80 formed on the output shaft 78, wherein the second transmission part 66 as a switching hub or switching sleeve is provided with an internal toothing 82 and an external toothing 84. The internal toothing 82 of the second transmission part 66 is formed in a complementary manner with respect to the external toothing 80 on the output shaft 78 such that a rotationally fixed connection and axial displaceability are ensured. An internal toothing 86, 88 is in each case formed both on the first transmission part 56 and on the second belt pulley 70, wherein the internal toothing 86 on the first transmission part 56 and the internal toothing 88 on the second belt pulley 70 can be brought into rotational connection with the external toothing 84 formed on the second transmission part 66 optionally by axial displacement of the second transmission part 56 and thus a drive connection can be produced either between the first belt pulley 68 and output shaft 78 or second belt pulley 70 and output shaft 78. In addition, the axial distance between the internal toothing 86 on the first transmission part 56 and the internal toothing 88 on the belt pulley is selected such that the second transmission part 66 can be brought by axial displacement into an intermediate position in which the external toothing 84 on the first transmission part 56 can be positioned between the two internal toothings 86 and 88, and therefore an idling, in which neither the first transmission part 56 nor the second belt pulley 70 is rotationally connected to the drive shaft 78, can be achieved by the intermediate position. An adjusting knob 90 is formed at an end of the second transmission part 56 protruding from the transmission device 58, by means of which adjusting knob a manual axial displacement of the second transmission part 66 can be initiated, wherein axial displacement of the second transmission part optionally between a switching position for connection to the first belt pulley 68 makes it possible for the connection to the second belt pulley 70 or for idling to be selected.

The output shaft 78 is designed as a hollow shaft with a further internal toothing 92 and is in turn in engagement with a further external toothing 94, which is formed on a drive shaft 96 of an instrument or device (not shown) to be driven by the transmission device 58, for example a chopping, cutting, blowing or conveying device, which devices are to be driven at different rotational speeds. The latter is achieved in that the belt pulleys 68, 70 are formed with different diameters, as a result of which different transmission ratios are achieved. Furthermore, the transmission device 58 is provided with a dirt-repelling sealing collar 98, which is placed at the transmission opening onto the second transmission part 66 and additionally covers the shaft sealing ring 12 and protects the latter against contamination from the outside (see in particular FIGS. 5 and 6).

The fixing device 10 for the shaft sealing ring 12 is particularly useful as soon as the first transmission part 56 and thus also the shaft sealing ring 12 is brought into rotation by driving of the first belt pulley 68. By means of rotation, the shaft sealing ring 12 is subjected to certain centrifugal forces and there is the risk that the spring element 52 which is arranged in the shaft sealing ring 12 and exerts a contact force on the sealing lip 50 and ensures a certain tightness between the sealing lip and the second transmission part 66, becomes detached or the contact force of the spring element 52 is reduced by the effect of centrifugal forces. The pivot bodies 16 formed on the fixing device 10 ensure an increasing contact force, as the centrifugal force increases, and fixing on the spring element 10, wherein the first pivot arms 26 which are pivoted outward into the recesses 64 by the centrifugal force cause pivoting of the second pivot arms 28 or of the pivot arm parts 34 formed on the second pivot arms 28 and pressing and fixing of the spring element. This prevents the spring element from becoming detached or a decrease in the contact force on the sealing lip 50 even at a high rotational speed.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A fixing device for a shaft sealing ring, comprising:

a retaining ring which is rotatable about an axis of rotation and a plurality of pivot bodies arranged pivotably on the retaining ring, wherein each pivot body has a pivot bearing through which the retaining ring extends as a pivot axis, wherein each of the pivot bodies comprises a first and second pivot arm which each extend from the pivot bearing in opposite directions axially with respect to the axis of rotation such that the retaining ring is arranged between the pivot arms and a deflection of the first pivot arm in a first direction radially with respect to the axis of rotation causes a deflection of the second pivot arm in a direction opposite to the first direction radially with respect to the axis of rotation.

2. The fixing device of claim 1, wherein the product of the mass of the first pivot arm and the distance of the mass center of gravity of the first pivot arm from the pivot axis is greater than the product of the mass of the second pivot arm and the distance of the mass center of gravity of the second pivot arm from the pivot axis, and therefore a centrifugal force arising by rotation of the retaining ring about an axis of rotation causes the first pivot arm to be deflected radially outward with respect to the axis of rotation.

3. The fixing device of claim 1, wherein the plurality of pivot bodies have a round or circular profile.

4. The fixing device of claim 1, wherein the plurality of pivot bodies comprise a metal material.

5. The fixing device of claim 4, wherein the plurality of pivot bodies comprise a cast-iron material.

6. The fixing device of claim 1, wherein the first pivot arm is in the form of a cylindrical extent and the second pivot arm is in the form of a T-shaped extent.

7. The fixing device of claim 1, wherein the plurality of pivot bodies are coupled to the retaining ring via an opening formed between the ends of the retaining ring, and the plurality of pivot bodies are pivotably suspended or pivotably mounted on the retaining ring.

8. The fixing device of claim 1, wherein the second pivot arm has a pivot arm part formed parallel along the pivot axis, and a retaining groove is formed on the side of the pivot arm part that is facing the axis of rotation of the pivot arm part.

* * * * *